Figure 1:
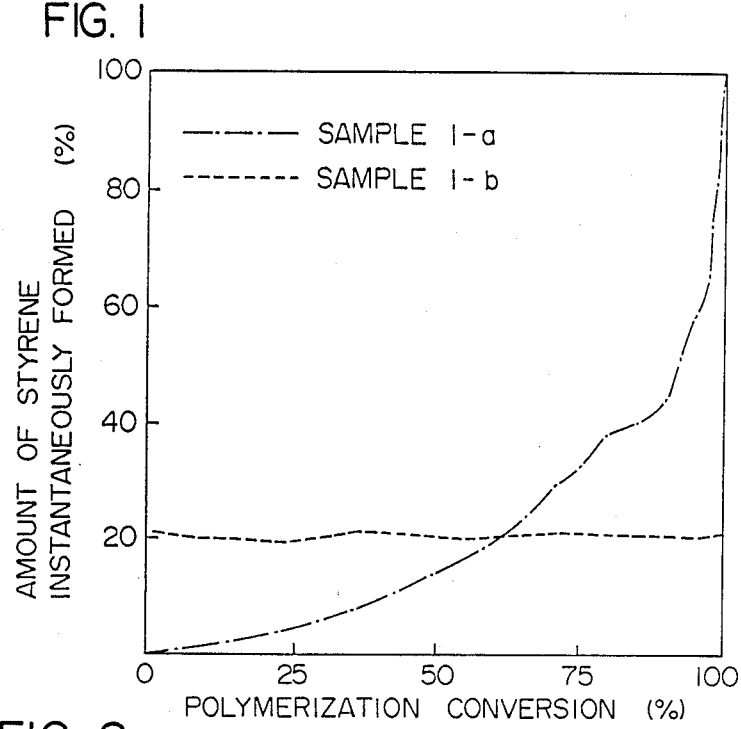

United States Patent [19]

Oyama et al.

[11] Patent Number: 4,950,719

[45] Date of Patent: Aug. 21, 1990

[54] RUBBER COMPOSITION

[75] Inventors: Tetsuo Oyama, Kamakura; Fumitoshi Suzuki; Akio Ueda, both of Yokohama; Akihiro Shibahara, Komaki, all of Japan

[73] Assignees: Nippon Zeon Co., Ltd.; Tokai Rubber Industries, Ltd., both of Japan

[21] Appl. No.: 286,880

[22] Filed: Dec. 20, 1988

[51] Int. Cl.$^5$ ............................ C08L 7/00; C08L 9/06
[52] U.S. Cl. ...................... 525/212; 525/217; 525/218; 525/237; 525/99; 180/312
[58] Field of Search ............... 525/237, 194, 212, 217, 525/218; 180/312

[56] References Cited

U.S. PATENT DOCUMENTS

| | | | |
|---|---|---|---|
| 4,391,942 | 7/1983 | Nakauchi et al. | 525/237 |
| 4,626,568 | 12/1986 | Sato et al. | 524/526 |
| 4,810,746 | 3/1989 | Tsutsumi et al. | 525/237 |
| 4,848,511 | 7/1989 | Ohyama et al. | 180/312 |

FOREIGN PATENT DOCUMENTS

| | | | |
|---|---|---|---|
| 0063029 | 10/1982 | European Pat. Off. | 524/526 |
| 62323839 | 12/1987 | Japan. | |

*Primary Examiner*—Allan M. Lieberman
*Attorney, Agent, or Firm*—Sherman & Shalloway

[57] ABSTRACT

A rubber composition which gives a rubber vibration insulator having excellent low-temperature properties comprises as a main rubber component a blend composed of (a) 10 to 90 parts by weight of a tapered styrene/butadiene copolymer rubber which has an average bound styrene content of 10 to 40% by weight and a 1,2-bond content in the butadiene portion of at least 50% by weight and in which the bound styrene content increases or decreases in one direction along the copolymer molecular chain and (b) 90 to 10 parts by weight of natural rubber and/or synthetic polyisoprene rubber.

12 Claims, 1 Drawing Sheet

RUBBER COMPOSITION

This invention relates to a rubber composition for production of rubber vibration insulator, and more specifically to a novel rubber composition which gives a rubber vibration insulator rubber having an excellent balance between vibration and sound insulating properties at ordinary temperature and vibration insulating properties at low temperatures.

With the recent highly advanced performance of automobiles, it has been desired to improve the vibration properties of rubber vibration insulator, or decrease the vibration transfer constant, in order to suppress vibration or noises and increase riding comfort. Development efforts have been directed to rubber vibration insulators which have a large loss factor (tan δ) in a low-frequency vibration region and a low dynamic-to-static modulus ratio (Kd/Ks where Kd is a dynamic spring constant and Ks is a static spring constant) in a high-frequency vibration region. For this purpose, the present inventors previously found that when a rubber vibration insulator is made from a rubbery polymer obtained by reacting an alkali metal- and/or alkaline earth metal-added rubbery polymer with an organic compound having a

bond (in which X represents an oxygen or sulfur atom) or a specific (thio)benzophenone, a rubber vibration insulator having an excellent balance between the loss factor and the dynamic-to-static modulus ratio can be obtained. This technique was applied for a patent (EP No. 198295A). These rubber vibration insulators certainly have excellent vibration insulating properties at room temperature, but to improve their vibration insulating properties and fatigue resistance at low temperatures, it is necessary to use them as a blend with natural rubber and/or synthetic polyisoprene rubber. In particular, when the rubbery polymer is a styrene/butadiene copolymer rubber, there is a problem to be solved. Specifically, even when it is blended with natural rubber and/or synthetic polyisoprene rubber in order to improve vibration insulating properties at low temperatures, sufficient low-temperature properties cannot be obtained. Specifically, the ratio of the dynamic spring constant at $-10°$ C. ($Kd_{-10\,°C.}$) of the resulting vulcanized rubber composition to that at room temperature ($Kd_{RT}$) cannot be sufficiently lowered.

It is an object of this invention therefore to provide a novel rubber composition which gives a rubber vibration insulator having an excellent balance between vibration and sound insulating properties at ordinary temperature and vibration insulating properties at low temperatures.

The present inventors worked extensively on the relation between the composition of a styrene/butadiene copolymer rubber in a blend of the styrene/butadiene copolymer rubber and natural rubber and/or synthetic polyisoprene rubber and its low-temperature vibration insulating properties. This work has led to the discovery that a rubber composition obtained by blending natural rubber and/or synthetic polyisoprene rubber and a tapered styrene/butadiene copolymer rubber in which the bound styrene content increases or decreases in one direction along the molecular chain in a specific blending ratio gives a rubber vibration insulator having markedly improved vibration insulating properties at low temperatures while retaining excellent vibration properties at room temperature.

Thus, according to this invention, there is provided a rubber composition capable of giving a rubber vibration insulator having low-temperature properties, said composition comprising as a main rubber component a blend composed of (a) 10 to 90 parts by weight of a tapered styrene/butadiene copolymer rubber which has an average bound styrene content of 10 to 40% by weight and a 1,2-bond content in the butadiene portion of at least 50% by weight and in which the bound styrene content increases or decreases in one direction along the copolymer molecular chain and (b) 90 to 10 parts by weight of natural rubber and/or synthetic polyisoprene rubber.

The tapered styrene/butadiene copolymer rubber used in this invention is obtained by a so-called living polymerization between 1,3-butadiene and styrene in the presence of a catalyst based on an alkali metal and/or an alkaline earth metal. Specifically, it may be, for example, a tapered styrene/butadiene copolymer rubber which has an average bound styrene content of 10 to 40% by weight, preferably 15 to 30% by weight, and a 1,2-bond content in the butadiene portion of at least 50% by weight, preferably at least 60% by weight, and in which the bound styrene content varies from one end of the molecular chain to the other end along the molecular chain such that the average bound styrene content of one end portion (for example, a portion formed in the early stage of the living polymerization) of the molecular chain is not more than 1/5 of the average bound styrene content and the bound styrene content of the other end portion (for example, a portion formed in the terminal stage of the living polymerization) of the molecular chain is at least two times the average bound styrene content.

This tapered styrene/butadiene copolymer rubber can be obtained by, for example, anionic polymerization using an alkyllithium catalyst in the presence of a polar compound such as an ether or a tertiary amine in a hydrocarbon solvent, in which only 1,3-butadiene is placed as a monomer in the reaction system before the start of polymerization, and simultaneously with the starting of the polymerization, a styrene monomer is added at a predetermined rate stepwise or continuously until the end of the polymerization.

The microstructure of the butadiene portion can be caused to have the above specified 1,2-bond content (at least 50% by weight) by varying the type and amount of the polar compound, and the polymerization temperature.

If the average bound styrene content of the copolymer exceeds 40% by weight, its loss factor at room temperature is large. But its dynamic-to-static modulus ratio does not become low even when it is blended with natural rubber and/or synthetic polyisoprene rubber, and an improvement in low-temperature properties cannot be obtained. If the average bound styrene content is less than 10% by weight, the loss factor at room temperature is small and no sufficient vibration insulating effect can be obtained. If the 1,2-bond content of the butadiene portion of the styrene/butadiene copolymer is less than 50% by weight, its compatibility with natural rubber and/or synthetic polyisoprene rubber is poor and vibration insulating properties at low temperature cannot be improved while retaining the excellent vibration insulating effect at room temperature.

By blending the tapered styrene/butadiene copolymer rubber and natural rubber and/or synthetic polyisoprene rubber in a weight ratio of from 10:90 to 90:10, the balance between excellent vibration insulating properties at room temperature and vibration properties at low temperatures can be markedly improved. If the blending proportion of natural rubber and/or synthetic polyisoprene rubber is less than 10% by weight, the effect of improving low-temperature vibration insulating properties cannot be obtained. If it exceeds 90% by weight, the excellent vibration insulating properties at room temperature of the tapered styrene/butadiene copolymer cannot be retained. The preferred ratio of the tapered styrene/butadiene copolymer rubber and natural rubber and/or synthetic polyisoprene rubber is from 80:30 to 20:70, especially from 70:50 to 30:50, by weight.

The above-exemplified tapered styrene/butadiene copolymer rubber in which the bound styrene content varies from one end of the molecular chain to the other end along the molecular chain such that the average bound styrene content of one end portion of the molecular chain is not more than 1/5 of the average bound styrene content and the bound styrene content of the other end portion of the molecular chain is at least two times the average bound styrene content is especially preferred in this invention. If the bound styrene content at one end of the molecular chain is more than 1/5 of the average bound styrene content, it is difficult to maintain the copolymer and the natural rubber and/or polyisoprene rubber in a moderate compatible state, and an effect of improving low-temperature properties by blending tends to be difficult to obtain.

In the rubber composition of this invention, at least a portion of the tapered styrene/butadiene copolymer rubber may be replaced with a rubber obtained by reacting living tapered styrene/butadiene copolymer with an organic compound having the

bond (where X represents an oxygen or sulfur atom) in the molecule and/or at least one compound selected from the group consisting of ketones, aldehydes, thioketones and thioaldehydes which have an amino group and/or a substituted amino group. Such a rubber composition of this invention can give a rubber vibration insulator having a more improved balance between vibration insulating properties at room temperature and vibration insulating properties at low temperature.

The organic compound having the

bond in the molecular chain is a compound which reacts with the living tapered styrene/butadiene copolymer rubber. Compounds that fall within this compound are disclosed, for example, in EP No. 198295A, and can be used without any particular limitation. Specific examples of the compound include amides such as formamide, N,N-dimethylformamide, N,N-diethylformamide, acetamide, N,N-dimethylacetamide, N,N-diethylacetamide, aminoacetamide, N,N-dimethyl-N',N'-dimethylaminoacetamide, N',N'-dimethylaminoacetamide, N'-ethylaminoacetamide, N,N-dimethyl-N'-ethylaminoacetamide, N,N-dimethylaminoacetamide, N-phenyldiacetamide, acrylamide, N,N-dimethylacrylamide, N,N-dimethylmethacrylamide, propionamide, N,N-dimethyl propionamide, 4-pyridylamide, N,N-dimethyl-4-pyridylamide, benzamide, N-ethylbenzamide, N-phenylbenzamide, N,N-dimethylbenzamide, p-aminobenzamide, N',N'-(p-dimethylamino)benzamide, N',N'-(p-diethylamino)benzamide, N'-(p-methylamino)benzamide, N'-(p-ethylamino)benzamide, N,N-dimethyl-N'-(p-ethylamino)benzamide, N,N-dimethyl-N',N'-(p-diethylamino)benzamide, N,N-dimethyl-p-aminobenzamide, N-methylbenzamide, N-acetyl-N-2-naphthylbenzamide, succinamide, maleinamide, phthalamide, N,N,N',N'-tetramethylmaleinamide, N,N,N',N'-tetramethylphthalamide, succinimide, N-methylsuccinimide, maleimide, N-methylmaleimide, phthalimide, N-methylphthalimide, oxamide, N,N,N',N'-tetramethyloxamide, N,N-dimethyl-p-amino-benzalacetamide, nicotinamide, N,N-diethylnicotinamide, 1,2-cyclohexanedicarboximide, N-methyl-1,2-cyclohexanedicarboximide, methyl carbamate, methyl N-methyl-carbamate, ethyl N,N-diethyl-carbamate, ethyl N,N-diethyl-carbamate, ethyl carbanilate, and ethyl p-N,N-diethylaminocarbanilate; ureas such as urea, N,N'-dimethylurea, N,N,N',N'-tetramethylurea, 1,3-dimethylethyleneurea; anilides such as formanilide, N-methylacetanilide, aminoacetanilide, benzanilide, and p,p'-di(N,N-diethyl)-aminobenzanilide; lactams such as epsilon-caprolactam, N-methyl-epsilon-caprolactam, N-acetyl-epsilon-caprolactam, 2-pyrrolidone, N-methyl-2-pyrrolidone, N-acetyl-2-pyrrolidone, N-phenyl-2-pyrrolidone, 2-piperidone, N-acetyl-2-piperidone, 2-quinolone, N-methyl-2-quinolone, 2-indolinone and N-methyl-2-indolinone; imidazolidinones such as 1,3-diethyl-2-imidazolidinone, 1-methyl-3-ethyl-2-imidazolidinone, 1-methyl-3-(2-methoxyethyl)-2-imidazolidinone; isocyanuric acids such as isocyanuric acid and N,N',N''-trimethylisocyanuric acid; and sulfur-containing compounds corresponding to the foregoing compounds. Those in which an alkyl or aryl group is bonded to the nitrogen are especially preferred.

Examples of the ketones, aldehydes, thioketones and thioaldehydes having an amino group and/or a substituted amino group include ketones such as 4-aminobenzophenone, 4-dimethylaminobenzophenone, 4-dimethylamino-4'-methylbenzophenone, 4,4'-diaminobenzophenone, 4,4'-bis(dimethylamino)benzophenone, 4,4'-bis(diethylamino)benzophenone, 4,4'-bis(ethylamino)benzophenone, 3,3'-dimethyl-4,4'-bis(diethylamino)benzophenone, 3,3'-dimethoxy-4,4'-bis(dimethylamino)benzophenone, 3,3',5,5'-tetraaminobenzophenone, 2,4,6-triaminobenzophenone, 3,3',5,5'-tetra(diethylamino)benzophenone, 4-dimethylaminoacetophenone, 1,3-bis(diphenylamino)-2-propanone and 1,7-bis(methylethylamino)-4-heptanone; the corresponding thioketones; aldehydes such as 3-dimethylaminopropionaldehyde, 3-diethylaminopropionaldehyde, 4-dimethylaminobenzaldehyde, 3-dicyclohexylaminopropionaldehyde and 3,5-bis(dihexylamino)benzaldehyde; and the corresponding thioaldehydes.

The substituted amino group preferably has an alkyl group as the substituent, and a dialkyl-substituted amino group is especially preferred. Substituents other than the amino group and the substituted amino group may be present in these compounds if the other substituents do not adversely affect the reaction.

The amount of the above compound to be reacted with the living tapered styrene/butadiene copolymer is equimolar to, or slightly larger in moles than, the amount of the metal bound to the copolymer. After the reaction, the tapered styrene/butadiene copolymer having the above compound bound thereto can be obtained by adding a coagulating agent such as methanol to the reaction solution or blowing steam into the reaction solution to perform hydrolysis.

It is believed that after the reaction, the above compound is introduced into the carbon atom at the end of the molecular chain of the rubbery polymer as an atomic grouping of the following formula.

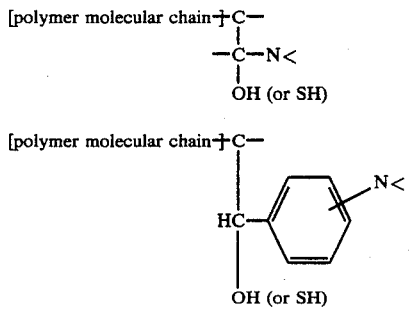

The use of a polymer obtained by the reaction of a living tapered styrene/butadiene copolymer rubber having butadienyl metal terminals with the above compound leads to a further improvement in vibration insulating properties.

After the end of the above reaction, the product may further be reacted with an acid and/or a halogen compound. In this case, an unsaturated rubbery polymer having a salt or charge transfer complex of the above atomic grouping introduced thereinto is obtained and can be used as the rubber component (A) in the rubber composition of the invention. The Mooney viscosity ($ML_{1+4,\ 100\ °C}$) of the tapered styrene/butadiene copolymer rubber having the above compound introduced thereinto is usually in the range of 10 to 200, preferably 20 to 150. If it is less than 10, the mechanical properties, such as tensile strength, of the copolymer is inferior. If it exceeds 200, the miscibility of the copolymer with another rubber is poor, and the processing operation becomes difficult. Moreover, the mechanical properties of a vulcanizate from the resulting rubber compound are undesirably reduced.

The tapered styrene/butadiene copolymer rubber may, wholly or partly, be used as an oil-extended rubber. A rubber vibration insulator may be obtained by kneading the rubber composition of the invention with various compounding agents such as sulfur, stearic acid, zinc oxide, various vulcanization accelerators, reinforcing agents or fillers (e.g., SRF, FEF and HAF carbon blacks, silica, and calcium carbonate), process oils, and plasticizers by means of a mixer such as a roll or a Banbury mixer, molding the mixture and vulcanizing it.

Figure 2:
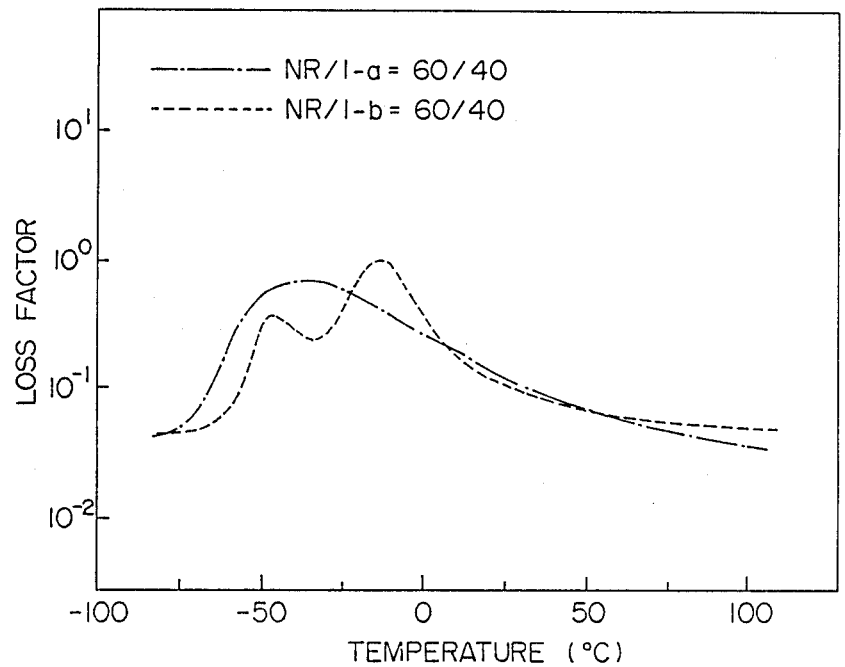

Since the styrene/butadiene copolymer rubber in the rubber composition of this invention has a 1,2-bond content in the butadiene portion of at least 50% by weight, it essentially has mutual solubility to some extent in natural rubber and/or synthetic polyisoprene rubber. It also has partial compatibility with the natural rubber and/or synthetic polyisoprene rubber because the bound styrene content of the molecular chain increases or decreases in one direction along the molecular chain. Consequently, as shown in FIG. 2 of the accompanying drawings which shows the temperature dependence of the loss factor (tan δ) of the vulcanized rubber compound, the peak position of the tan δ at low temperatures (about 0° to −10° C.) can be shifted toward a lower temperature side without decreasing tan δ at room temperature. Accordingly, the rubber composition of this invention can give a rubber vibration insulator having a much lower ratio of the dynamic spring constant at a low temperature (−10° C.) ($Kd_{-10\ °C}$) to the dynamic spring constant at room temperature ($Kd_{RT}$), $Kd_{-10\ °C}/Kd_{RT}$, than in the case of using a conventional copolymer rubber whose bound styrene content does not vary along the molecular chain.

The following Examples illustrate the present invention more specifically. In these examples, all parts and percentages are by weight unless otherwise specified.

For evaluation of vibration insulating properties in these examples, loss factor (tan δ) at 25° C., 15 Hz and a compression strain of ±0.2%, dynamic spring constant $Kd_{23\ °C}$ at 23° C. (room temperature), 100 Hz and a compression strain of ±0.2%, and dynamic spring constant $Kd_{-10\ °C}$ at −10° C. (low temperature), 100 Hz and a compression strain of ±0.2% were measured on N2 specimens of JIS K-6394 by means of a hydraulic servo-type dynamic tester (Model KC-V made by Saginomiya Seisakusho, Japan). Static spring constant ($Ks_{23\ °C}$) was determined in accordance with JIS K-6385. The dynamic-to-static modulus ratio ($Kd_{23\ °C}/Ks_{23\ °C}$) and the dynamic spring constant ratio ($Kd_{-10\ °C}/Kd_{23\ °C}$) were calculated.

In the accompanying drawings,

FIG. 1 is a graph showing the relation between the polymerization conversion and the amount of bound styrene instantaneously formed using sample 1-a of the invention and comparative sample 1-b in Example 1; and FIG. 2 is a graph showing the temperature dependences of the loss factors of vulcanizates from rubber composition obtained by blending 40 parts by weight of sample 1-a or sample 1-b in Example 1 with 60 parts of natural rubber (NR).

EXAMPLE 1

Styrene/butadiene copolymer rubbers used in this Example were prepared by the following methods.

(1) Sample 1-a of the invention

A 15-liter stainless steel polymerization vessel was washed, dried and purged with dry nitrogen. Then, 640 g of 1,3-butadiene, 4700 g of cyclohexane and 6.5 millimoles of N,N,N',N'-tetramethylethylenediamine were fed into the vessel, and further, 6.4 millimoles of n-butyllithium (n-hexane solution) was added. Polymerization of 1,3-butadiene was started at 45° C. Immediately after the start of the polymerization, styrene was continuously added at stepwise varying rates of addition. The total amount of styrene added was 160 g. After polymerization for about 2 hours, 5 ml of methanol was added to the reaction mixture to stop the reaction. Then, 8 g of 2,6-di-t-butyl-p-cresol (BHT) was added, and the mixture was coagulated with steam. It was then dehydrated on rolls and further dried in vacuum at 60° C. for 24 hours. During the polymerization, a small amount of the polymer solution was sampled from the reactor every 5 minutes. The sequence distribution (see FIG. 1) of styrene was determined from the conversions and styrene contents measured on the samples.

(2) Comparative sample 1-b

A 10-liter stainless steel polymerization vessel was washed, dried and purged with dry nitrogen. Then, 4000 g of cyclohexane and 8.0 millimoles of N,N,N',N'-tetramethylethylenediamine were fed into the vessel, and 6.0 millimoles of n-butyllithium (n-hexane solution) was added. While the reactor was maintained at 45° C., a mixture of 160 g of styrene and 640 g of butadiene was continuously added at a rate of 5.0 g per minute. During the polymerization, a small amount of the polymer solution was sampled from the reactor every 20 minutes, and the sequence distribution of styrene was determined from the conversions and styrene contents measured on the samples. This led to the determination that the product was a random copolymer without styrene tapering (see FIG. 1). After the conversion reached 100%, 5 ml of methanol was added to stop the reaction. The reaction mixture was coagulated and dried by the same methods as in the preparation of sample 1-a.

(3) Comparative sample 2-a

Comparative sample 2-a was prepared by the same method as in the preparation of sample 1-a except that 200 g of styrene, 600 g of butadiene and 1.2 millimoles of N,N,N',N'-tetramethylethylenediamine were used.

(4) Comparative sample 2-b

Comparative sample 2-b was prepared by the same method as in the preparation of sample 1-b except that 200 g of styrene, 600 g of butadiene and 1.2 millimoles of N,N,N',N'-tetramethylethylenediamine were used and the rate of addition was changed to 2.0 g/min.

(5) The vinyl bond content and the bound styrene content of each of the polymer rubber samples obtained above were determined by infrared spectroscopy [Hampton, Anal. Chem., 21, 923 (1949)].

(6) Rubber compositions were prepared from the samples obtained in accordance with the compounding recipe shown in Table 1. The rubber compositions were each vulcanized to prepare samples. The vibration insulating properties of the samples were measured. The temperature dependence of the loss factor was measured at 15 Hz and a shear strain amplitude of 0.5% by means of a rheometric dynamic analyzer (made by Rheometric Company).

The results are shown in Table 2.

TABLE 1

| compounding recipe | |
|---|---|
| Ingredient | Amount (parts) |
| Natural rubber (RSS#3) | 60 |
| Polymer rubber (samples in Table 2 or 3) | 40 |
| FEF carbon black | 40 |
| Aromatic process oil | 15 |
| Zinc oxide No. 3 | 5 |
| Stearic acid | 2 |
| Vulcanization accelerator (N-cyclohexyl-2-benzothiazyl sulfenamide) | 1.2 |
| Sulfur | 1.8 |
| Antioxidant (N-isopropyl-N'-phenyl-p-phenylenediamine) | 1.5 |
| Antioxidant (polymer of 2,2,4-trimethyl-1,2-dihydroquinoline) | 1.5 |
| Total | 168.0 |

TABLE 2

| | Sample | | | |
|---|---|---|---|---|
| | 1-a | 1-b* | 2-a* | 2-b* |
| Polymer structural properties | | | | |
| Average bound styrene content (%) | 20 | 20 | 25 | 25 |
| Styrene tapering | yes | no | yes | no |
| Vinyl bond content (%) | 60 | 60 | 35 | 35 |
| Polymer Mooney viscosity ($ML_{1+4}$, 100° C.) | 46 | 44 | 52 | 50 |
| Vibration insulating properties | | | | |
| Static spring constant ($Ks_{23°\,C.}$) (23° C.) (kg/mm) | 8.26 | 8.33 | 8.48 | 8.56 |
| Dynamic spring constant ($Kd_{23°\,C.}$) (100 Hz, 23° C.) (kg/mm) | 15.7 | 15.7 | 15.5 | 15.5 |
| Dynamic-to-static modulus ratio ($Kd_{23°\,C.}/Ks_{23°\,C.}$) | 1.90 | 1.88 | 1.83 | 1.81 |
| Loss factor (tan δ) (15 Hz, 23° C.) | 0.128 | 0.127 | 0.119 | 0.121 |
| Low temperature properties | | | | |
| Dynamic spring constant ($Kd_{-10°\,C.}$) (100 Hz, −10° C.) (kg/mm) | 45.3 | 60.6 | 50.4 | 49.9 |
| Dynamic spring constant ratio ($Kd_{-10°\,C.}/Kd_{23°\,C.}$) | 2.89 | 3.87 | 3.25 | 3.29 |

*Comparisons

Table 2 shows that sample 1-a (invention) is equivalent in vibration insulating properties (dynamic-static modulus ratio and loss factor) at room temperature to comparative sample 1-b of the same composition, and had a less rise in dynamic spring constant ($Kd_{-10°\,C.}$) at a low temperature (−10° C.) and a lower $Kd_{-10°\,C.}/Kd_{23°\,C.}$ value than comparative sample 1-b. It was furthermore determined from the results given in Table 2 that when there is tapering in the bound styrene content but the vinyl bond content is low (sample 2-a), a blend of the styrene/butadiene copolymer with natural rubber and/or synthetic polyisoprene rubber does not give a vulcanizate having improved low-temperature vibration insulating properties.

EXAMPLE 2

Copolymer rubbers used in this example were prepared by the following methods.

(1) Sample 3-a of the invention

In accordance with the same polymerization recipe and conditions as in the preparation of sample 1-a in Example 1, the polymerization was carried out for 2 hours. Then, 1.0 g of 4,4'-bis(diethylamino)benzophenone was added, and reacted for 30 minutes. Then, 5 ml of methanol was added to stop the reaction. The reaction mixture was coagulated and dried by the same methods as in Example 1.

(2) Sample 4-a of the invention

This sample was prepared in the same way as in the preparation of sample 3-a except that 140 g of styrene, 660 g of butadiene and 6.0 millimoles of N,N,N',N'-tetramethylethylenediamine were used.

(3) Sample 5-a of the invention

This sample was prepared by the same method as in the preparation of sample 3-a except that 200 g of styrene, 600 g of butadiene and 6.2 millimoles of N,N,N',N'-tetramethylethylenediamine were used, and N-methyl-epsilon-caprolactam was used instead of 4,4'-bis(diethylamino)benzophenone.

(4) Comparative sample 3-b

This sample was prepared in the same way as in the preparation of comparative sample 1-b except that 170 g of styrene, 630 g of butadiene and 6.8 millimoles of N,N,N',N'-tetramethylethylenediamine were used, and before stopping the reaction by methanol, 1.0 g of 4,4'- bis(diethylamino)benzophenone was added and reacted for 30 minutes.

(5) Comparative sample 4-b

This sample was prepared by the same method as in the preparation of comparative sample 1-b except that 140 g of styrene, 660 g of butadiene and 6.0 millimoles of N,N,N',N'-tetramethylethylenediamine were used.

(6) Comparative sample 5-b

This sample was prepared in the same way as in the preparation of comparative sample 3-b except that 200 g of styrene, 600 g of butadiene and 5.0 millimoles of N,N,N',N'-tetramethylethylenediamine were used, and N-methyl-epsilon-caprolactam was used instead of 4,4'-bis(diethylamino)benzophenone.

The microstructures of the polymer rubber samples were measured as in Example 1.

Rubber compositions were prepared from the samples in accordance with the compounding recipe shown in Table 1. The rubber compositions were vulcanized to obtain samples for measuring vibration insulating properties. The results of measurement of the vibration insulating properties are shown in Table 3.

TABLE 3

|  | Sample | | | | | |
| --- | --- | --- | --- | --- | --- | --- |
|  | 3-a | 4-a | 5-a | 3-b* | 4-b* | 5-b* |
| Polymer structural properties | | | | | | |
| Average bound styrene content (%) | 21.0 | 17.4 | 25.0 | 21.5 | 17.0 | 24.5 |
| Styrene tapering | yes | yes | yes | no | no | no |
| Vinyl bond content (%) | 69.7 | 66.0 | 60.5 | 70.1 | 67.0 | 59.0 |
| Molecular chain end modifier | EAB[1] | EAB | NMC[2] | EAB | EAB | NMC |
| Polymer Mooney viscosity ($ML_{1+4}$, 100° C.) | 50 | 48 | 48 | 51 | 45 | 46 |
| Vibration insulating properties | | | | | | |
| Static spring constant ($Ks_{23° C.}$) (23° C.) (kg/mm) | 7.61 | 7.62 | 7.74 | 7.66 | 7.71 | 7.81 |
| Dynamic spring constant ($Kd_{23° C.}$) (100 Hz, 23° C.) (kg/mm) | 13.7 | 13.4 | 15.7 | 13.7 | 13.3 | 15.6 |
| Dynamic-to-static modulus ratio ($Kd_{23° C.}/Ks_{23° C.}$) | 1.81 | 1.75 | 2.03 | 1.78 | 1.73 | 2.00 |
| Loss factor (tan δ) (15 Hz, 23° C.) | 0.143 | 0.118 | 0.162 | 0.143 | 0.116 | 0.153 |
| Low temperature properties | | | | | | |
| Dynamic spring constant ($Kd_{-10° C.}$) (100 Hz, −10° C.) (kg/mm) | 48.5 | 37.1 | 62.2 | 104.5 | 71.6 | 142.6 |
| Dynamic spring constant ratio ($Kd_{-10° C.}/Kd_{23° C.}$) | 3.54 | 2.77 | 3.96 | 7.65 | 5.37 | 9.13 |

*Comparisons
[1]4,4'-bis(diethylamino)benzophenone,
[2]N-methyl-epsilon-caprolactam The results given in Table 3 show that vibration insulator rubbers prepared by using samples 3-a, 4-a and 5-a of the invention had markedly improved low-temperature vibration insulating properties over rubber vibration insulators prepared by using the corresponding comparative samples 3-b, 4-b and 5-b.

We claim:

1. A rubber composition capable of giving a rubber vibration insulator having excellent low-temperature properties, said composition comprising as a main rubber component of blend composed of (a) 10 to 90 parts by weight of a tapered styrene/butadiene copolymer rubber which has a Mooney viscosity ($ML_{1+4, 100°C.}$) in the range of 10 to 200, and an average bound styrene content of 10 to 40% by weight and a 1,2-bond content in the butadiene portion of at least 50% by weight and in which the bound styrene content increases or descreases in one direction along the copolymer molecular chain such that the bound styrene content at one end portion of the molecular chain is not more than 1/5 of the average bound styrene content, and (b) 90 to 10 parts by weight of natural rubber and/or synthetic polyisoprene rubber.

2. The rubber composition of claim 1 in which the tapered styrene/butadiene copolymer rubber is a product of the reaction of a living tapered styrene/butadiene copolymer with an organic compound having a

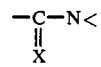

bond where X represents an oxygen or sulfur atom in the molecular chain and/or at least one compound selected from the group consisting of ketones, aldehydes, thioketones and thioaldehydes having an amino group and/or a substituted amino group.

3. The rubber composition of claim 1 or 2 in which in the tapered styrene/butadiene copolymer, the bound styrene content increases or decreases from one end of the molecular chain to the other end such that the bound styrene content at one end portion of the molecular chain is not more than 1/5 of the average bound styrene content and the bound styrene content at the other end portion of the molecular chain is 2 times the average bound styrene content.

4. The rubber composition of claim 2 in which the organic compound having said bond in the molecular chain is an amide, imide, urea, lactam, imidazolidinone or isocyanuric acid having at least one substituent at the nitrogen atom, or a corresponding thio compound.

5. The rubber composition of claim 1 in which the tapered styrene/butadiene copolymer rubber has an average bound styrene content of 15 to 30% by weight and a 1,2-bond content in the butadiene portion of at least 60% by weight.

6. The rubber composition of claim 1 or 2 wherein the blend is composed of the tapered styrene/butadiene copolymer rubber (a) and the rubber (b) at a ratio (a):(b) of from 80:30 to 20:70.

7. The rubber composition of claim 1 or 2 wherein the blend is composed of the tapered styrene/butadiene copolymer rubber (a) and the rubber (b) at a ratio (a):(b) of from 70:50 to 30:50.

8. The rubber composition of claim 2 wherein a living tapered styrene/butadiene copolymer rubber having butadienyl metal terminals is reacted with said organic compound.

9. The rubber composition of claim 1 or 2 wherein the tapered styrene/butadiene copolymer rubber has a Mooney viscosity ($ML_{1+4, 100°C}$) in the range of 20 to 150.

10. The rubber composition of claim 1 or 2 which has been molded and vulcanized to provide a rubber vibration insulator having excellent low-temperature properties.

11. A method for providing vibration insulation comprising molding and vulcanizing a vibration insulating effective amount of a vibration insulating rubber composition comprising as a main rubber component a blend composed of (a) 10 to 90 parts by weight of a tapered styrene/butadiene copolymer rubber which has a Mooney viscosity ($ML_{1+4, 100°C}$) in the range of 10 to 200, and an average bound styrene content of 10 to 40% by weight and a 1,2-bond content in the butadiene portion of at least 50% by weight and in which the bound styrene content increases or decreases in one direction along the copolymer molecular chain such that the bound styrene content at one end portion of the molecular chain is not more than 1/5 of the average bound styrene content, and (b) 90 to 10 parts by weight of natural rubber and/or synthetic polyisoprene rubber and using the resulting vulcanized material as a vibration insulator.

12. The method of claim 11 wherein said rubber composition further comprises a filler.

* * * * *

UNITED STATES PATENT AND TRADEMARK OFFICE
CERTIFICATE OF CORRECTION

PATENT NO.   : 4,950,719
DATED        : August 21, 1990
INVENTOR(S)  : OYAMA, ET AL.

It is certified that error appears in the above-identified patent and that said Letters Patent is hereby corrected as shown below:

Claim 1, line 4, delete "of", first occurrence, insert --a--.

TITLE PAGE: insert Foreign Application Priority Data --Dec. 23, 1987[JP] JAPAN . . . . .62-323839--.

Signed and Sealed this

Eighteenth Day of August, 1992

Attest:

DOUGLAS B. COMER

*Attesting Officer*    *Acting Commissioner of Patents and Trademarks*